(No Model.)

D. A. DYER.
Submarine and Surface Wall.

No. 231,957. Patented Sept. 7, 1880.

Witnesses:
John L. Boone
Wm. F. Clark

Inventor:
David A. Dyer
by his Attys,
Boone & Coburn

UNITED STATES PATENT OFFICE.

DAVID A. DYER, OF FERNDALE, CALIFORNIA.

SUBMARINE AND SURFACE WALL.

SPECIFICATION forming part of Letters Patent No. 231,957, dated September 7, 1880.

Application filed May 27, 1880. (No model.)

*To all whom it may concern:*

Be it known that I, DAVID A. DYER, of Ferndale, county of Humboldt, in the State of California, have invented certain new and useful Improvements in Submarine and Surface Walls; and I do hereby declare that the following is a full, clear, and exact description thereof, reference being had to the accompanying drawings.

My invention relates to the construction of breakwaters, levees, bulk-heads, and other structures which are built in water or on boggy soil, either to direct the flow of water in a particular channel, prevent an overflow of water, or furnish a solid foundation in water or on marshy and treacherous ground.

It consists in the employment of wooden boxes of suitable size and shape, open at one end, and filled with cement, gravel, or other heavy substance or material, and provided with guides or interlocking projections, by means of which they can be slid down one upon another into place and be held against any side thrust or pressure.

These boxes can be constructed in various ways; but the plan which I have found to be best adapted for ordinary use is herein specifically described and set forth, without reference to the various other arrangements which might be adapted.

Figure 1:
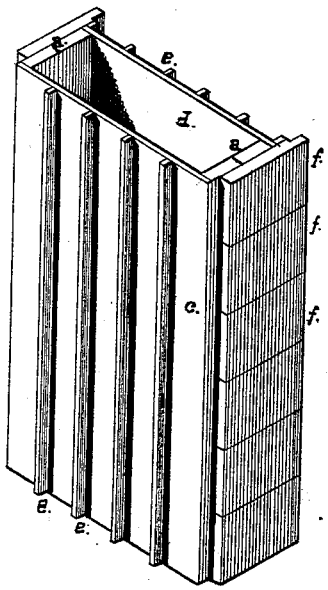
Figure 2:
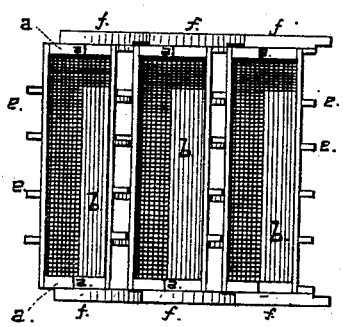
Figure 3:
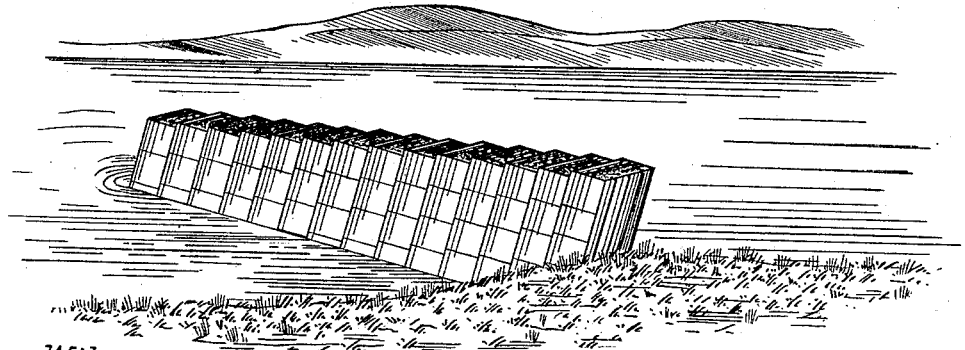

Referring to the accompanying drawings, Figure 1 is a perspective view of one of the boxes. Fig. 2 is a top view of three boxes laid in position. Fig. 3 is a perspective view, showing the method of constructing the breakwater.

Fig. 1 represents a wooden box of any desired size; but for deep water I shall ordinarily make it eight feet wide, twelve feet long, and two feet deep, (8×12×2.) The sides $a\ a$ and closed end $b$, I will make of strong heavy timbers or joist, two inches in thickness, in one or more pieces. The top $c$ and bottom $d$ of the box I make of one-inch plank placed transversely across and nailed to the sides $a\ a$, thus forming a strong and substantial box. On the top and bottom of each box I will nail two or more scantlings, $e$, parallel with each other and running lengthwise of the box. These scantlings I will arrange so that the scantlings on one box will interlock with the scantlings on the next box, as shown at Fig. 2.

When the sides $a\ a$ are made of two or more pieces of timber, I will take pieces of two-inch plank $ff$, each of which is two and a half feet (more or less) long, and nail them on the outside of the sides $a\ a$, close together. These pieces I will place so that one end will overlap or project beyond the scantlings $e$ four inches (more or less) on one corner, leaving their opposite ends set down a corresponding distance from the other corner of the box. This forms a projection along one edge and a corresponding rabbet along the opposite edge, so that when two boxes are placed together, one upon the other, the scantlings $e$ not only interlock with each other, but the projecting edge of the planks $ff$ of one box fits the corresponding rabbet along the edge of the next box. These planks not only serve to secure the two timbers of the sides $a\ a$ together, but they form what I call "water-sides." In some cases only one water-side will be serviceable, and in many cases none need be used.

In constructing a breakwater or submarine bulk-head with these boxes, I fill them with cement, gravel, earth, or any heavy substance or material, and place them in position in the following manner, (shown at Fig. 3:)

Beginning at the land, I form an embankment at the desired angle and slide down the embankment one of the boxes so that its lower end will rest upon the bottom, while the box rests against the embankment. I then slide down another box so that it will rest upon the one previously sent down, and so on until a single layer of boxes have been laid, resting upon each other and against the embankment. Upon this layer of boxes I then place another layer by sliding them down upon the boxes already laid, in the same manner as previously described, the ribs or scantlings $e$ forming guides, which direct the boxes one upon another and prevent them from being displaced. I thus proceed, allowing each layer to find its own bottom, and sending down a sufficient number to complete the structure above the water-level. Usually, however, each layer can be made of one continuous box, extending from the bottom to the surface of the water, and in repairing a place where a a layer or box has settled the addition is made by splicing the end of the box, so as to extend it upward. I prefer this method of construction.

This forms a strong and substantial wall or structure that will resist the action of water as long as the wood retains its strength, and in case any of the boxes or layers should settle the structure can be repaired by adding to the top of the settled boxes. In fact, one of the important advantages of this structure is that if the foundation upon which it rests, or upon which any of the boxes rest, should cave or wash away the boxes will slide down and fill the vacancy, and their displacement can be remedied at the surface by building on top of the settled layer of boxes. Each layer of boxes acts independent of all the other layers.

In building levees and land structures the boxes need not be made so large, and two or more series of boxes can be placed side by side, so as to form a wide levee, on which a road can be built, or the boxes can be built of the full width, as preferred. For leveeing rivers this system will be of great value, as the boxes will prevent squirrels and gophers from burrowing through the levee, thus avoiding one of the greatest evils heretofore encountered with earth levees.

It is apparent that a breakwater, bulk-head, or levee built in this way will resist any side strain or pressure that will ordinarily come upon it, as the interlocking ribs or scantlings combined with the weight of the boxes will form a solid and almost impregnable wall.

Having thus described my invention, what I claim, and desire to secure by Letters Patent, is—

A wall or other structure composed of wooden boxes $a\ b\ c\ d$, filled with cement, gravel, or other heavy substance, and provided with interlocking projections or ribs $e$, which also form guides for sending the boxes into place, substantially as specified.

In witness whereof I have hereunto set my hand and seal.

DAVID A. DYER. [L. S.]

Witnesses:
 WM. F. CLARK,
 EDWARD E. OSBORN.